(12) United States Patent
Mitsutani

(10) Patent No.: US 8,937,455 B2
(45) Date of Patent: Jan. 20, 2015

(54) CHARGING APPARATUS FOR VEHICLE AND METHOD FOR CHARGING VEHICLE

(75) Inventor: Noritake Mitsutani, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 730 days.

(21) Appl. No.: 12/675,094

(22) PCT Filed: Sep. 2, 2008

(86) PCT No.: PCT/JP2008/065731
§ 371 (c)(1),
(2), (4) Date: Feb. 24, 2010

(87) PCT Pub. No.: WO2009/034877
PCT Pub. Date: Mar. 19, 2009

(65) Prior Publication Data
US 2011/0127956 A1 Jun. 2, 2011

(30) Foreign Application Priority Data
Sep. 10, 2007 (JP) .................. 2007-234418

(51) Int. Cl.
*H02J 7/00* (2006.01)
*H01M 10/44* (2006.01)
(Continued)

(52) U.S. Cl.
CPC .............. *H01M 10/44* (2013.01); *B60K 6/365* (2013.01); *B60K 6/445* (2013.01); *B60L 11/1812* (2013.01); *B60L 11/1814* (2013.01); *B60L 11/1816* (2013.01); *B60W 10/08* (2013.01);
(Continued)

(58) Field of Classification Search
None
See application file for complete search history.

(56) References Cited

U.S. PATENT DOCUMENTS 5,596,258 A * 1/1997 Kimura et al. ............... 320/163
5,684,379 A 11/1997 Svedoff
(Continued)

FOREIGN PATENT DOCUMENTS

JP         A-2-146937      6/1990
JP         A-7-298502      11/1995
(Continued)

OTHER PUBLICATIONS

Nov. 4, 2008 Search Report mailed in International Patent Application No. PCT/JP2008/065731 (with translation).
(Continued)

*Primary Examiner* — Edward Tso
*Assistant Examiner* — Robert Grant
(74) *Attorney, Agent, or Firm* — Oliff PLC

(57) ABSTRACT

An ECU detects a rated current that can be supplied from a power supply to a power storage device, based on a pilot signal. If a combination of detected values of a voltage, the rated current and a power supply frequency matches a predefined combination, the ECU executes charging with a voltage, a current and a frequency in accordance with the combination. On the other hand, if it is determined that the combination of the voltage, the rated current and the frequency does not match any one of predefined combinations and if it is determined that the power supply itself is normal, the ECU executes charging by limiting a charging current to a predefined minimum rated current value. If it is determined that the combination of the voltage, the rated current and the frequency does not match any one of predefined combinations and if it is determined that the power supply is abnormal, the ECU prohibits charging.

12 Claims, 12 Drawing Sheets

(51) Int. Cl.
  *B60K 6/365* (2007.10)
  *B60K 6/445* (2007.10)
  *B60L 11/18* (2006.01)
  *B60W 10/08* (2006.01)
  *B60W 10/26* (2006.01)
  *B60K 1/02* (2006.01)
  *B60W 20/00* (2006.01)

(52) U.S. Cl.
  CPC .............. *B60W 10/26* (2013.01); *B60K 1/02* (2013.01); *B60L 2220/14* (2013.01); *B60L 2220/54* (2013.01); *B60L 2230/12* (2013.01); *B60W 20/00* (2013.01); *B60W 2510/244* (2013.01); *Y02T 10/6239* (2013.01); *Y02T 10/6269* (2013.01); *Y02T 10/641* (2013.01); *Y02T 10/7005* (2013.01); *Y02T 10/7088* (2013.01); *Y02T 90/121* (2013.01); *Y02T 90/127* (2013.01); *Y02T 90/14* (2013.01)
  USPC .......................................... 320/109; 320/111

(56) References Cited

U.S. PATENT DOCUMENTS

| | | | |
|---|---|---|---|
| 6,456,056 B1 * | 9/2002 | Katoh et al. | 324/76.41 |
| 2004/0130288 A1 * | 7/2004 | Souther et al. | 320/104 |
| 2006/0087291 A1 | 4/2006 | Yamauchi | |
| 2006/0113798 A1 * | 6/2006 | Oyobe et al. | 290/7 |
| 2006/0273764 A1 * | 12/2006 | Huang | 320/151 |

FOREIGN PATENT DOCUMENTS

| | | |
|---|---|---|
| JP | A-7-298506 | 11/1995 |
| JP | A-8-502160 | 3/1996 |
| JP | A-502160 | 3/1996 |
| JP | A-10-285819 | 10/1998 |
| JP | A-11-205909 | 7/1999 |
| JP | A-2000-232737 | 8/2000 |
| JP | A-2007-97342 | 4/2007 |
| WO | WO 94/08381 A1 | 4/1994 |
| WO | WO 2007/037240 A1 | 4/2007 |

OTHER PUBLICATIONS

"Electric Vehicle Conductive Charging System: General Requirements," Japan Electric Vehicle Association Standard, Mar. 29, 2001, 109, Japan (with translation).

"SAE Electric Vehicle Conductive Charge Coupler," SAE International, Nov. 2001, pp. 1-32, J1772, U.S.A.

* cited by examiner

CHARGING APPARATUS FOR VEHICLE AND METHOD FOR CHARGING VEHICLE

TECHNICAL FIELD

The present invention relates to a charging apparatus for a vehicle and a method for charging a vehicle. In particular, the present invention relates to a charging apparatus for a vehicle by which a vehicle-mounted power storage device for driving the vehicle is charged from a power supply external to the vehicle, and a method for charging the vehicle.

BACKGROUND ART

In recent years, an electric vehicle, a hybrid vehicle, a fuel cell vehicle and the like have received attention as an environmentally-friendly vehicle. On these vehicles, a motor that generates driving force for traveling as well as a power storage device that stores electric power supplied to the motor are mounted. The hybrid vehicle further has an internal combustion engine mounted thereon as a power source, together with the motor. The fuel cell vehicle has a fuel cell mounted thereon as a direct current (DC) power supply for driving the vehicle.

Among these vehicles, a vehicle is known in which a vehicle-mounted power storage device for driving the vehicle can be charged from a power supply in ordinary households. For example, a power supply outlet provided at home is connected to a charging port provided at the vehicle by using a charging cable, so that electric power is supplied from the power supply in the ordinary households to the power storage device. It is noted that the vehicle in which the vehicle-mounted power storage device can be charged from the power supply provided outside the vehicle will also be referred to as "a plug-in vehicle" hereinafter.

The standard for the plug-in vehicle is set in "Electric Vehicle Conductive Charging System, General Requirements" (Non-Patent Document 1) in Japan, and in "SAE Electric Vehicle Conductive Charge Coupler" (Non-Patent Document 2) in the United States of America.

In "Electric Vehicle Conductive Charging System, General Requirements" and "SAE Electric Vehicle Conductive Charge Coupler," the standard for a control pilot is defined as an example. The control pilot is defined as a control line that connects, via a control circuit on the vehicle side, a ground of the vehicle and a control circuit of EVSE (Electric Vehicle Supply Equipment) for supplying electric power from an on-premises wiring to the vehicle (Non-Patent Document 1). Based on a pilot signal communicated through this control line, a connection state of the charging cable, whether or not electric power is supplied from the power supply to the vehicle, a rated current of the EVSE and the like are determined.

When a charging current flowing from the power supply to the power storage device exceeds the rated current of the EVSE, there arise problems such as tripping of a breaker and overheating of the charging cable. In order to address these problems, Japanese Patent Laying-Open No. 2000-232737 (Patent Document 1), for example, discloses that, in a charging apparatus capable of converting alternating current (AC) electric power outside the vehicle to DC electric power by an inverter and charging a secondary battery, charging stops if an input current of the secondary battery does not match a current target value of the inverter for charging (see Patent Document 1).

Patent Document 1: Japanese Patent Laying-Open No. 2000-232737
Patent Document 2: Japanese Patent Laying-Open No. 7-298506
Patent Document 3: Japanese Patent Laying-Open No. 10-285819
Patent Document 4: Japanese Patent Laying-Open No. 11-205909
Non-Patent Document 1: "Japan Electric Vehicle Association Standard, Electric Vehicle Conductive Charging System, General Requirements" Japan Electric Vehicle Association, Mar. 29, 2001
Non-Patent Document 2: "SAE Electric Vehicle Conductive Charge Coupler" SAEJ1772, SAE International, November, 2001

DISCLOSURE OF THE INVENTION

Problems to be Solved by the Invention

If charging stops as in the charging apparatus disclosed in Japanese Patent Laying-Open No. 2000-232737, however, an opportunity for charging may be missed although charging is possible electrically. As a result, the marketability as a plug-in vehicle may be reduced.

Furthermore, the details of a method for executing charging while ensuring safety in a case where charging is possible electrically such as in a case where the power supply is normal in spite of the occurrence of some abnormality are not set in either "Electric Vehicle Conductive Charging System, General Requirements" or "SAE Electric Vehicle Conductive Charge Coupler" described above.

Therefore, an object of the present invention is to provide a charging apparatus for a vehicle capable of suppressing loss of the opportunity for charging as much as possible and allowing safe charging.

Furthermore, another object of the present invention is to provide a method for charging a vehicle capable of suppressing loss of the opportunity for charging as much as possible and allowing safe charging.

Means for Solving the Problems

According to the present invention, a charging apparatus for a vehicle is directed to a charging apparatus for a vehicle by which a vehicle-mounted power storage device for driving the vehicle is charged from a power supply external to the vehicle, including a detecting unit, a charging execution unit, and a control unit. The detecting unit detects electric power that can be supplied to the vehicle from the power supply external to the vehicle. The charging execution unit receives the electric power supplied from the power supply external to the vehicle and executes charging of the power storage device, in accordance with a provided command. The control unit determines whether or not a suppliable electric power detected by the detecting unit is included in a predefined standard, and controls the charging execution unit based on a result of determination. The control unit controls the charging execution unit to execute charging in accordance with the suppliable electric power, if the control unit determines that the suppliable electric power is included in the predefined standard. On the other hand, the control unit controls the charging execution unit to execute charging by limiting a charging current to a predefined value, if the control unit determines that the suppliable electric power is not included in the predefined standard and if the control unit determines that the power supply is normal based on a voltage of the power supply detected by the detecting unit. The control unit prohibits charging, if the control unit determines that the suppliable electric power is not included in the predefined standard and if the control unit determines that the power supply is abnormal.

Preferably, the predefined value is a minimal rated current value included in the predefined standard.

Preferably, the vehicle includes a vehicle inlet configured to be capable of connecting a charging cable through which the electric power is supplied to the vehicle from the power supply external to the vehicle. The control unit performs a process of determining whether or not the suppliable electric power is included in the predefined standard, if the control unit determines that the charging cable is connected to the vehicle inlet, based on a connection signal indicating that the charging cable is connected to the vehicle inlet.

Preferably, the detecting unit includes a voltage detecting unit and a rated current detecting unit. The voltage detecting unit detects the voltage of the power supply external to the vehicle. The rated current detecting unit detects a rated value of a current that can be received from the power supply external to the vehicle. The control unit determines whether or not the suppliable electric power is included in the predefined standard, based on whether or not a combination of the voltage detected by the voltage detecting unit and a rated current detected by the rated current detecting unit matches at least one predefined combination.

More preferably, the control unit further detects a frequency of the power supply external to the vehicle based on the detected voltage, and determines whether or not the suppliable electric power is included in the predefined standard, based on whether or not a combination of the detected voltage, the rated current and the frequency matches the at least one predefined combination.

Preferably, the rated current detecting unit includes an EVSE controller, a control pilot line and a signal detecting unit. The EVSE controller is provided outside the vehicle for generating a pilot signal having a duty set in accordance with a magnitude of the rated current. The pilot signal can be transmitted to the vehicle through the control pilot line. The signal detecting unit is mounted on the vehicle for detecting the rated current based on the pilot signal received from the control pilot line. The control unit determines that at least one of the EVSE controller and the control pilot line is abnormal if the control unit determines that the suppliable electric power is not included in the predefined standard and if the control unit determines that the power supply is normal based on the voltage of the power supply external to the vehicle, and controls the charging execution unit to execute charging by limiting the charging current to the predefined value.

Preferably, the rated current detecting unit includes an EVSE controller, a control pilot line and a signal detecting unit. The EVSE controller is provided outside the vehicle for generating a pilot signal having a duty set in accordance with a magnitude of the rated current. The pilot signal can be transmitted to the vehicle through the control pilot line. The signal detecting unit is mounted on the vehicle for detecting the rated current based on the pilot signal received from the control pilot line. The EVSE controller can be operated by receiving the electric power from the power supply external to the vehicle. The control unit determines that a conducting path is disconnected in a power line through which the electric power received from the power supply external to the vehicle is supplied to the vehicle, if the pilot signal is sensed by the signal detecting unit and if the voltage detected by the voltage detecting unit is substantially zero.

Preferably, the charging execution unit is mounted on the vehicle, and includes first and second AC rotating electric machines, first and second inverters, a pair of power lines, and a charging control unit. The first AC rotating electric machine includes, as a stator winding, a first multiphase winding connected in a form of a star. The second AC rotating electric machine includes, as a stator winding, a second multiphase winding connected in a form of a star. The first inverter is connected to the first multiphase winding for performing electric power conversion between the first AC rotating electric machine and the power storage device. The second inverter is connected to the second multiphase winding for performing electric power conversion between the second AC rotating electric machine and the power storage device. The pair of power lines are connected to a first neutral point of the first multiphase winding and a second neutral point of the second multiphase winding for providing the first and second neutral points with the electric power supplied from the power supply external to the vehicle. The charging control unit controls the first and second inverters to convert a voltage of the electric power provided from the pair of power lines to the first and second neutral points and charge the power storage device.

Preferably, the charging execution unit is mounted on the vehicle. The charging execution unit includes a charger for converting the electric power supplied from the power supply external to the vehicle to a voltage level of the power storage device and charging the power storage device.

Furthermore, according to the present invention, a method for charging a vehicle is directed to a method for charging a vehicle configured such that a vehicle-mounted power storage device for driving the vehicle can be charged from a power supply external to the vehicle, and includes first to sixth steps. In the first step, electric power that can be supplied to the vehicle from the power supply external to the vehicle is detected. In the second step, it is determined whether or not a suppliable electric power detected in the first step is included in a predefined standard. In the third step, charging is executed in accordance with the suppliable electric power if it is determined that the suppliable electric power is included in the predefined standard. In the fourth step, it is determined whether or not the power supply is normal based on a voltage of the power supply detected in the first step, if it is determined that the suppliable electric power is not included in the predefined standard. In the fifth step, charging is executed by limiting a charging current to a predefined value, if it is determined that the power supply is normal. In the sixth step, charging is prohibited if it is determined that the power supply is abnormal.

Preferably, the predefined value is a minimal rated current value included in the predefined standard.

Preferably, the vehicle includes a vehicle inlet configured to be capable of connecting a charging cable through which the electric power is supplied to the vehicle from the power supply external to the vehicle. The method for charging a vehicle further includes a seventh step. In the seventh step, it is determined whether or not the charging cable is connected to the vehicle inlet, based on a connection signal indicating that the charging cable is connected to the vehicle inlet. If it is determined in the seventh step that the charging cable is connected to the vehicle inlet, a process of determining whether or not the suppliable electric power is included in the predefined standard is performed in the second step.

Preferably, in the first step, the voltage of the power supply external to the vehicle and a rated value of a current that can be received from the power supply external to the vehicle are detected. In the second step, it is determined whether or not the suppliable electric power is included in the predefined standard, based on whether or not a combination of the voltage of the power supply that has been detected and the rated current that has been detected matches at least one predefined combination.

Further preferably, in the first step, a frequency of the power supply external to the vehicle is further detected based on the voltage that has been detected. In the second step, it is determined whether or not the suppliable electric power is included in the predefined standard, based on whether or not a combination of the detected voltage, the rated current and the frequency matches the at least one predefined combination.

Preferably, a pilot signal having a duty set in accordance with a magnitude of the rated current is generated outside the vehicle. The pilot signal is sent through a control pilot line to the vehicle. In the first step, the rated value of the current is detected based on the pilot signal received from the control pilot line. The method for charging a vehicle further includes an eighth step. In the eighth step, it is determined that an abnormality is found in the pilot signal if it is determined in the second step that the suppliable electric power is not included in the predefined standard and if it is determined in the fourth step that the power supply external to the vehicle is normal. If it is determined in the eighth step that the abnormality is found, charging is executed by limiting the charging current to the predefined value in the fifth step.

Preferably, a pilot signal having a duty set in accordance with a magnitude of the rated current is generated outside the vehicle by using the electric power from the power supply external to the vehicle. The pilot signal is sent through a control pilot line to the vehicle. In the first step, the rated value of the current is detected based on the pilot signal received from the control pilot line. The method for charging a vehicle further includes a ninth step. In the ninth step, it is determined that a conducting path is disconnected in a power line through which the electric power received from the power supply external to the vehicle is supplied to the vehicle, if the pilot signal is sensed in the first step and if the voltage that has been detected is substantially zero.

Effects of the Invention

In the present invention, the electric power that can be supplied to the vehicle from the power supply external to the vehicle is detected, and if it is determined that the suppliable electric power is included in the predefined standard, charging is executed in accordance with the suppliable electric power. On the other hand, if it is determined that the suppliable electric power is not included in the predefined standard and if it is determined that the power supply is normal based on the voltage of the power supply external to the vehicle, charging is executed by limiting the charging current to the predefined value. If it is determined that the suppliable electric power is not included in the predefined standard and if it is determined that the power supply external to the vehicle is abnormal, charging is prohibited. In other words, if it is determined that the suppliable electric power is not included in the predefined standard, charging is not prohibited without exception, but executed by limiting the charging current if it is determined that the power supply external to the vehicle is normal.

Therefore, according to the present invention, loss of an opportunity for charging can be suppressed as much as possible, and the power storage device can be safely charged from the power supply external to the vehicle.

Figure 1:
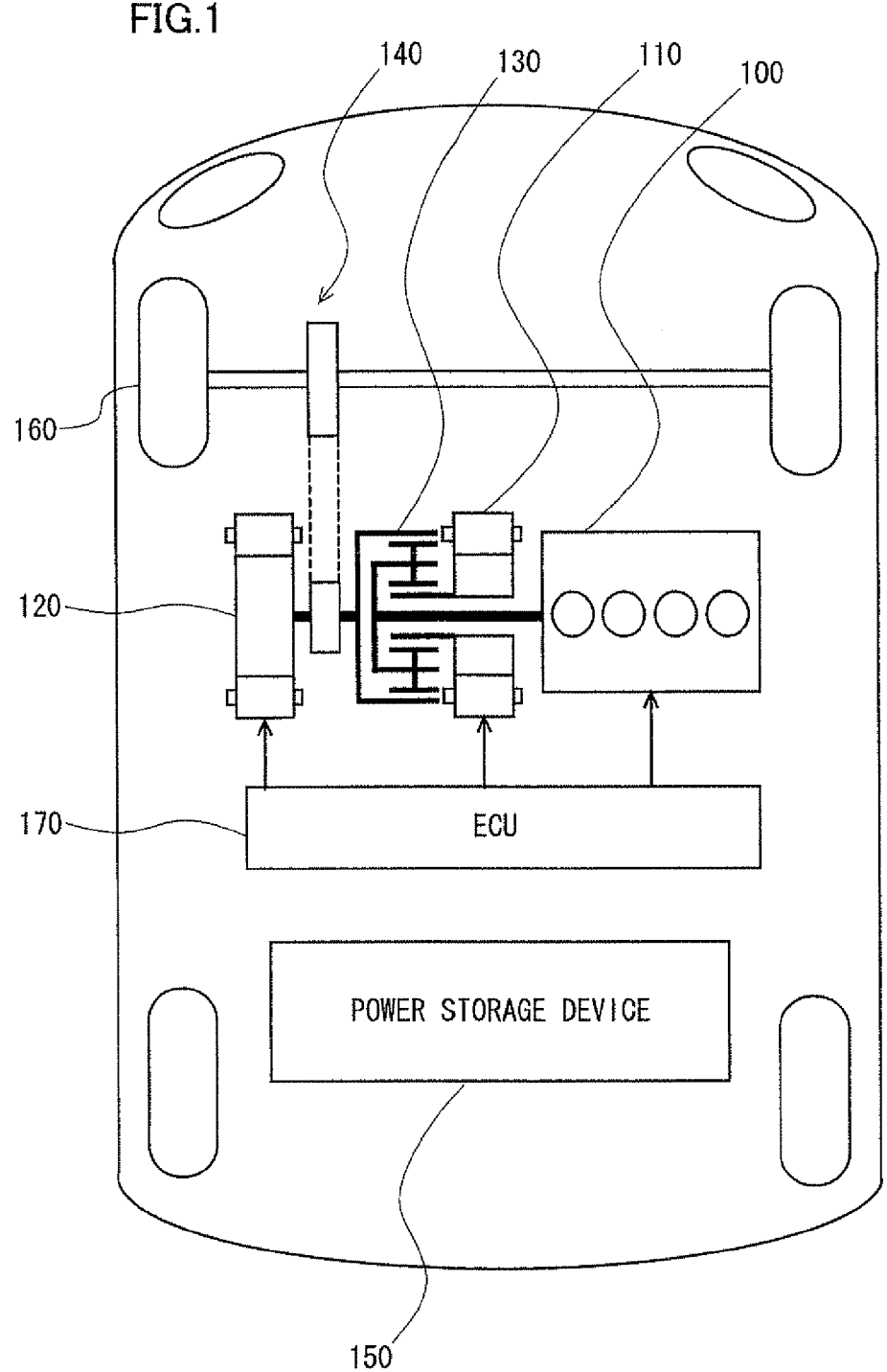
FIG. 1 is an overall block diagram of a plug-in hybrid vehicle shown as an example of a vehicle on which a charging apparatus for a vehicle according to an embodiment of the present invention is mounted.

DESCRIPTION OF THE REFERENCE SIGNS 100 engine; 110 first MG; 112, 122 neutral point; 120 second MG; 130 power split device; 140 reduction gear; 150 power storage device; 160 front wheel; 170 ECU; 171 voltage sensor; 172 current sensor; 200 converter; 210 first inverter; 210A, 220A upper arm; 21013, 220B lower arm; 220 second inverter; 250 SMR; 260 DFR; 270 charging port; 280 LC filter; 290 charger; 300 charging cable; 310 connector; 312 limit switch; 320 plug; 330 COD; 332 relay; 334 EVSE controller; 400 power supply outlet; 402 power supply; 510 power supply standard determining unit; 520 charging command generating unit; 530 inverter control unit; 610 phase detecting unit; 620 sinusoidal wave generating unit; 630 multiplying unit; 640 subtracting unit; 650 current control unit

BEST MODES FOR CARRYING OUT THE INVENTION

Embodiments of the present invention will be hereinafter described in detail with reference to the drawings. The same or corresponding portions are represented by the same reference characters in the drawings, and description thereof will not be repeated.

FIG. 1 is an overall block diagram of a plug-in hybrid vehicle shown as an example of a vehicle on which a charging apparatus for a vehicle according to an embodiment of the present invention is mounted. Referring to FIG. 1, this plug-in hybrid vehicle includes an engine 100, a first MG (Motor Generator) 110, a second MG 120, a power split device 130, a reduction gear 140, a power storage device 150, a drive wheel 160, and an ECU (Electronic Control Unit) 170.

Engine 100, first MG 110 and second MG 120 are coupled to power split device 130. This plug-in hybrid vehicle travels by using driving force from at least one of engine 100 and second MG 120. Motive power generated by engine 100 is split by power split device 130 into two paths, that is, one path through which the motive power is transmitted to drive wheel 160 via reduction gear 140, and the other through which the motive power is transmitted to first MG 110.

First MG 110 is an AC rotating electric machine, and is a three-phase AC synchronous motor including a U-phase coil, a V-phase coil and a W-phase coil, for example. First MG 110 generates electric power by using the motive power of engine 100 split by power split device 130. For example, when a state of charge (that will also be referred to as "SOC" hereinafter) of power storage device 150 falls below a predetermined value, engine 100 starts and electric power is generated by first MG 110. The electric power generated by first MG 110 is converted from AC to DC by an inverter (that will be described hereinafter), voltage thereof is adjusted by a converter (that will be described hereinafter), and then the electric power is stored in power storage device 150.

Second MG 120 is an AC rotating electric machine, and is a three-phase AC synchronous motor including a U-phase coil, a V-phase coil and a W-phase coil, for example. Second MG 120 generates driving force by using at least one of the electric power stored in power storage device 150 and the electric power generated by first MG 110. The driving force of second MG 120 is transmitted to drive wheel 160 via reduction gear 140. As a result, second MG 120 assists engine 100 or causes the vehicle to travel by using the driving force from second MG 120. Although drive wheel 160 is shown as a front wheel in FIG. 1, a rear wheel may be driven by second MG 120, instead of the front wheel or together with the front wheel.

It is noted that, at the time of braking and the like of the vehicle, second MG 120 is driven by drive wheel 160 via reduction gear 140, and second MG 120 is operated as a generator. As a result, second MG 120 is operated as a regenerative brake for converting braking energy to electric power. The electric power generated by second MG 120 is stored in power storage device 150.

Power split device 130 is formed of a planetary gear including a sun gear, a pinion gear, a carrier, and a ring gear. The pinion gear engages the sun gear and the ring gear. The carrier rotatably supports the pinion gear, and in addition, is coupled to a crankshaft of engine 100. The sun gear is coupled to a rotation shaft of first MG 110. The ring gear is coupled to a rotation shaft of second MG 120 and reduction gear 140.

Figure 2:
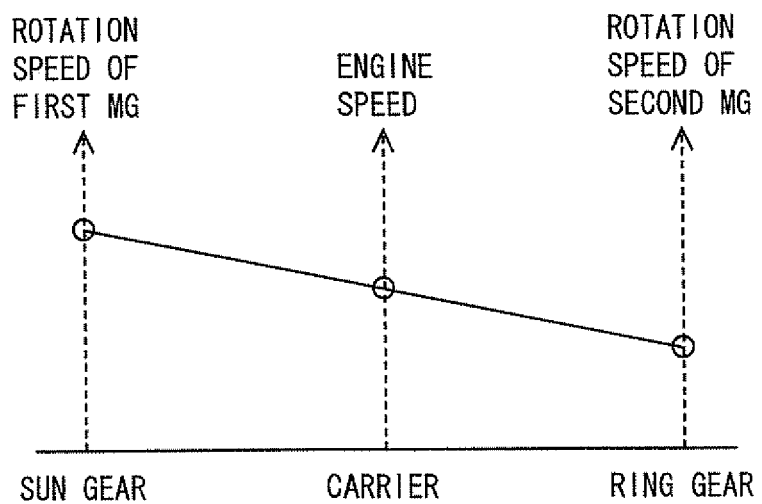
FIG. 2 illustrates a collinear chart of a power split device.

Engine 100, first MG 110 and second MG 120 are coupled with power split device 130 formed of the planetary gear being interposed therebetween, so that the relationship between rotation speeds of engine 100, first MG 110 and second MG 120 is such that they are connected by a straight line in a collinear chart as shown in FIG. 2.

Referring again to FIG. 1, power storage device 150 is a rechargeable DC power supply, and is formed of a secondary battery such as nickel hydride and lithium ion, for example. The voltage of power storage device 150 is, for example, about 200V. In addition to the electric power generated by first MG 110 and second MG 120, electric power supplied from a power supply external to the vehicle is stored in power storage device 150, as will be described hereinafter. It is noted that a large-capacitance capacitor can be employed as power storage device 150, and any electric power buffer may be employed if it can temporarily store the electric power generated by first MG 110 and second MG 120 as well as the electric power from the power supply external to the vehicle and supply the stored electric power to second MG 120.

Engine 100, first MG 110 and second MG 120 are controlled by ECU 170. It is noted that ECU 170 may be divided into a plurality of ECUs for each function. It is noted that a configuration of ECU 170 will be described hereinafter.

Figure 3:
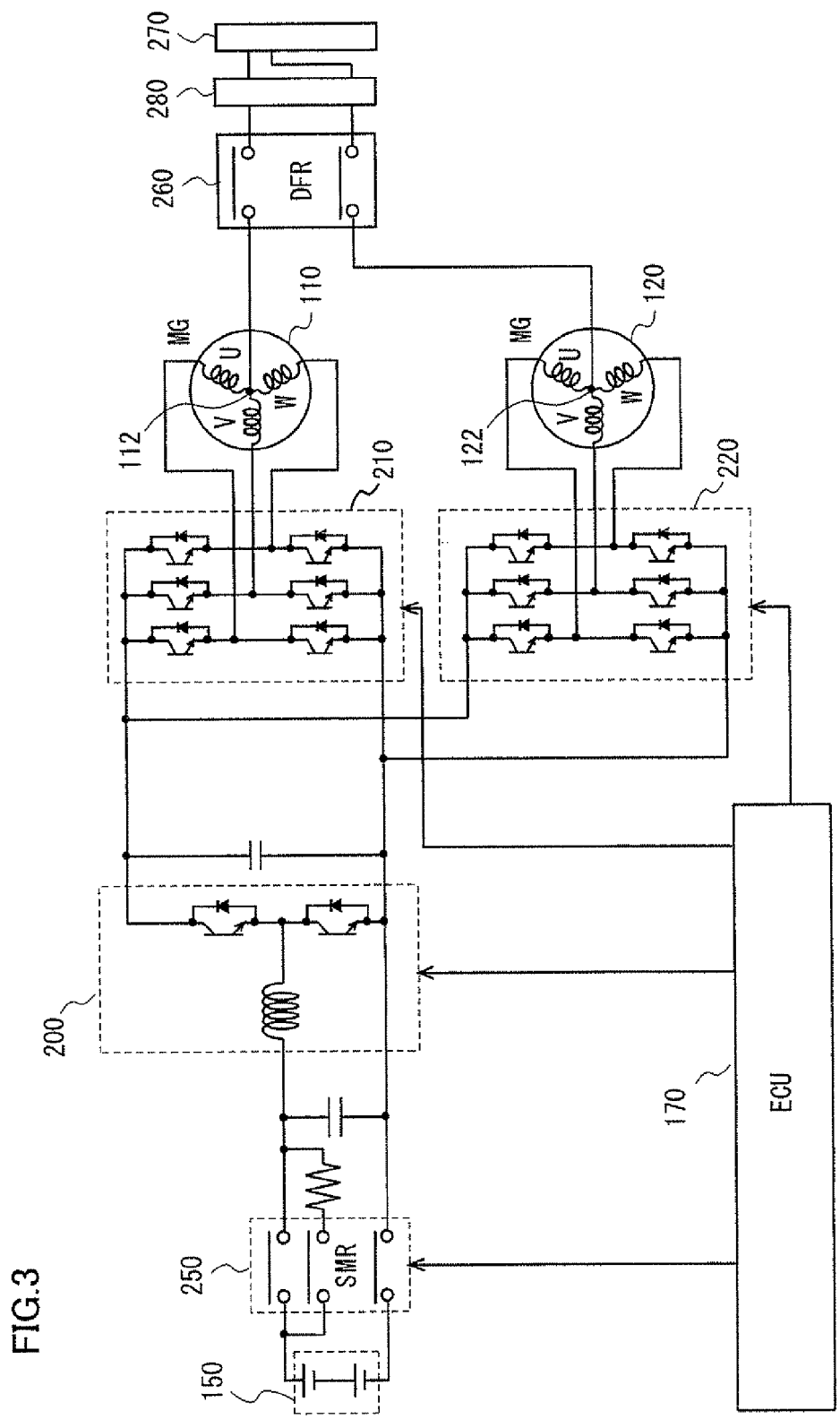
FIG. 3 is an overall configuration diagram of an electrical system in the plug-in hybrid vehicle shown in FIG. 1.

FIG. 3 is an overall configuration diagram of an electrical system in the plug-in hybrid vehicle shown in FIG. 1. Referring to FIG. 3, this electrical system includes power storage device 150, an SMR (System Main Relay) 250, a converter 200, a first inverter 210, a second inverter 220, first MG 110, second MG 120, a DFR (Dead Front Relay) 260, an LC filter 280, and a charging port 270.

SMR 250 is provided between power storage device 150 and converter 200. SMR 250 is a relay for electrically connecting/disconnecting power storage device 150 and the electrical system, and on/off of SMR 250 is controlled by ECU 170. In other words, when the vehicle travels and when power storage device 150 is charged from the power supply external to the vehicle, SMR 250 is turned on, and power storage device 150 is electrically connected to the electrical system. On the other hand, when the vehicle system stops, SMR 250 is turned off, and power storage device 150 is electrically disconnected from the electrical system.

Converter 200 includes a reactor, two npn-type transistors and two diodes. The reactor has one end connected to the positive electrode side of power storage device 150, and the other end connected to a connection node of the two npn-type transistors. The two npn-type transistors are connected in series, and each npn-type transistor has the diode connected in antiparallel.

It is noted that an IGBT (Insulated Gate Bipolar Transistor), for example, can be used as the npn-type transistor. Furthermore, a power switching element such as a power MOSFET (Metal Oxide Semiconductor Field-Effect Transistor) may be used instead of the npn-type transistor.

When electric power is supplied from power storage device 150 to first MG 110 or second MG 120, converter 200 boosts the electric power discharged from power storage device 150 and supplies the electric power to first MG 110 or second MG 120, based on a control signal from ECU 170. Furthermore, when power storage device 150 is charged with the electric power generated by first MG 110 or second MG 120, converter 200 steps down the electric power supplied from first MG 110 or second MG 120 and outputs the electric power to power storage device 150, based on a control signal from ECU 170.

First inverter 210 includes a U-phase arm, a V-phase arm and a W-phase arm. The U-phase arm, the V-phase arm and the W-phase arm are connected in parallel. Each phase arm includes two npn-type transistors connected in series, and each npn-type transistor has a diode connected in antiparallel. A connection point between the two npn-type transistors in each phase arm is connected to an end of a corresponding coil in first MG 110 that is different from a neutral point 112.

First inverter 210 converts DC electric power supplied from converter 200 to AC electric power, and supplies the converted AC electric power to first MG 110. Furthermore, first inverter 210 converts AC electric power generated by first MG 110 to DC electric power, and supplies the converted DC electric power to converter 200.

Second inverter 220 also has a configuration similar to that of first inverter 210. A connection point between two npn-type transistors in each phase arm is connected to an end of a corresponding coil in second MG 120 that is different from a neutral point 122.

Second inverter 220 converts DC electric power supplied from converter 200 to AC electric power, and supplies the converted AC electric power to second MG 120. Furthermore, second inverter 220 converts AC electric power generated by second MG 120 to DC electric power, and supplies the converted DC electric power to converter 200.

In addition, when power storage device 150 is charged from the power supply external to the vehicle, first inverter 210 and second inverter 220 convert AC electric power provided from the power supply external to the vehicle to neutral point 112 of first MG 110 and neutral point 122 of second MG 120, to DC electric power, based on a control signal from ECU 170, and supply the converted DC electric power to converter 200 by using a method that will be described hereinafter.

DFR 260 is provided between a pair of power lines connected to neutral point 112 of first MG 110 and neutral point 122 of second MG 120 and a pair of power lines connected to LC filter 280. DFR 260 is a relay for electrically connecting/disconnecting charging port 270 and the electrical system, and on/off of DFR 260 is controlled by ECU 170. In other words, when the vehicle travels, DFR 260 is turned off, and charging port 270 is electrically separated from the electrical system. On the other hand, when power storage device 150 is charged from the power supply external to the vehicle, DFR 260 is turned on, and charging port 270 is electrically connected to the electrical system.

LC filter 280 is provided between DFR 260 and charging port 270 and prevents output of a high-frequency noise from the electrical system of the plug-in hybrid vehicle to the power supply external to the vehicle when power storage device 150 is charged from the power supply external to the vehicle.

Charging port 270 serves as an electric power interface for receiving charging electric power from the power supply external to the vehicle, and as a vehicle inlet provided at the vehicle. When power storage device 150 is charged from the power supply external to the vehicle, a connector of a charging cable through which electric power is supplied to the vehicle from the power supply external to the vehicle is connected to charging port 270.

ECU 170 generates the control signals for driving SMR 250, converter 200, first inverter 210, and second inverter 220, and controls the operation of each of these devices.

Figure 4:
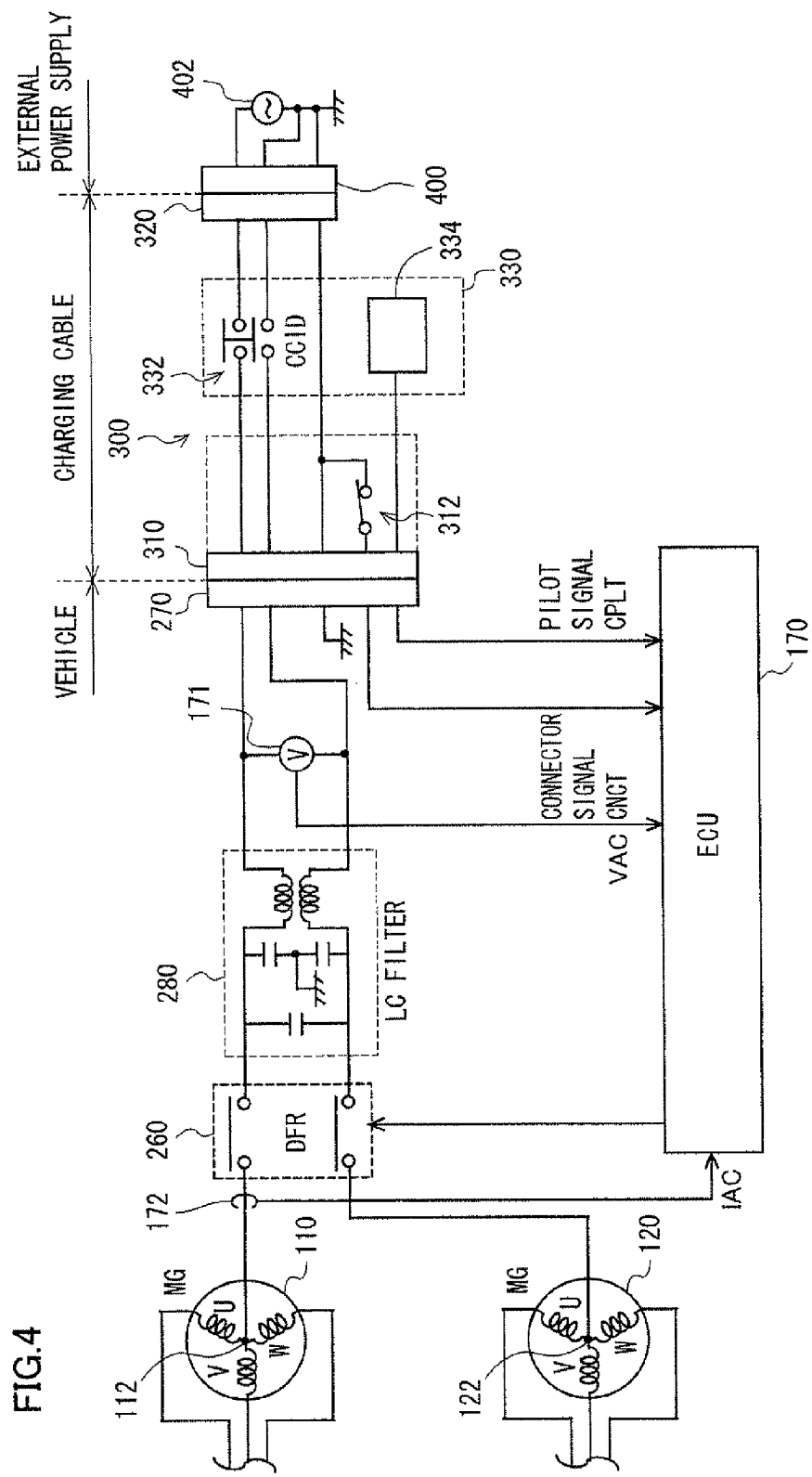
FIG. 4 illustrates a portion related to a charging mechanism of the electrical system shown in FIG. 3 in more detail.

FIG. 4 illustrates a portion related to a charging mechanism of the electrical system shown in FIG. 3 in more detail. Referring to FIG. 4, a charging cable 300 for coupling the plug-in hybrid vehicle and the power supply external to the vehicle includes a connector 310, a plug 320 and a CCID (Charging Circuit Interrupt Device) 330.

Connector 310 is configured to be capable of being inserted into charging port 270 provided at the vehicle. A limit switch 312 is provided at connector 310. When connector 310 is inserted into charging port 270, limit switch 312 is activated, and a connector signal CNCT indicating that connector 310 is inserted into charging port 270 is input to ECU 170.

Plug 320 is connected to a power supply outlet 400 provided at home, for example. AC electric power is supplied from a power supply 402 (for example, a system power supply) to power supply outlet 400.

CCID 330 includes a relay 332 and an EVSE controller 334. Relay 332 is provided in a pair of power lines through which charging electric power is supplied from power supply 402 to the plug-in hybrid vehicle. On/off of relay 332 is controlled by EVSE controller 334. When relay 332 is turned off, a conducting path through which electric power is supplied from power supply 402 to the plug-in hybrid vehicle is disconnected. On the other hand, when relay 332 is turned on, electric power can be supplied from power supply 402 to the plug-in hybrid vehicle.

When plug 320 is connected to power supply outlet 400, EVSE controller 334 is operated by the electric power supplied from power supply 402, EVSE controller 334 generates a pilot signal CPLT sent to ECU 170 of the vehicle through a control pilot line. When connector 310 is inserted into charging port 270, EVSE controller 334 causes pilot signal CPLT to oscillate in a predefined duty cycle. Furthermore, when preparation for charging is completed on the vehicle side, EVSE controller 334 turns on relay 332.

This EVSE controller 334 provides ECU 170 of the vehicle with a notification of a rated current that can be supplied from power supply 402 through charging cable 300 to the vehicle, in accordance with the duty cycle (a ratio of a pulse width to an oscillation cycle) of pilot signal CPLT.

Figure 5:
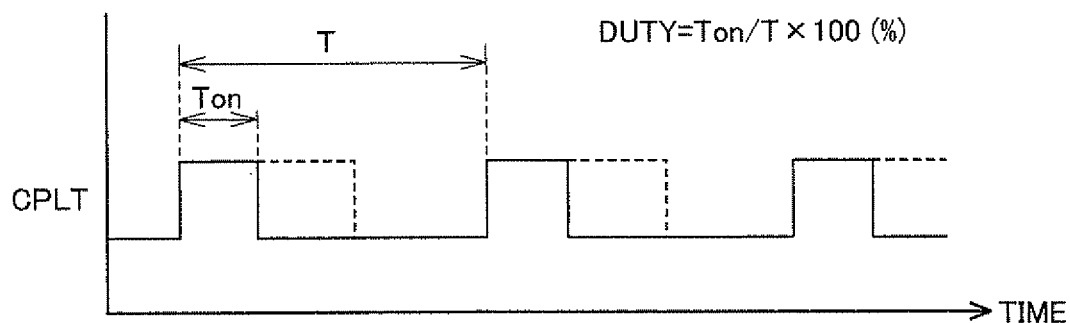
FIG. 5 illustrates a waveform of a pilot signal generated by an EVSE controller shown in FIG. 4.

FIG. 5 illustrates a waveform of pilot signal CPLT generated by EVSE controller 334 shown in FIG. 4. Referring to FIG. 5, pilot signal CPLT oscillates in a predefined cycle T. Here, a pulse width Ton of pilot signal CPLT is set based on the rated current that can be supplied from power supply 402 through charging cable 300 to the vehicle. The notification of the rated current is provided from EVSE controller 334 to ECU 170 of the vehicle by using pilot signal CPLT, in accordance with the duty indicated by a ratio of pulse width Ton to cycle T.

It is noted that the rated current is defined for each charging cable. Depending on the type of the charging cable, the rated current varies, and therefore, the duty of pilot signal CPLT also varies. ECU 170 of the vehicle receives, through the control pilot line, pilot signal CPLT sent from EVSE controller 334 provided at charging cable 300, and senses the duty of received pilot signal CPLT, so that ECU 170 of the vehicle can sense the rated current that can be supplied from power supply 402 through charging cable 300 to the vehicle.

Referring again to FIG. 4, a voltage sensor 171 and a current sensor 172 are provided on the vehicle side. Voltage sensor 171 detects a voltage VAC between a pair of power lines between charging port 270 and LC filter 280, and outputs the detected value to ECU 170. Current sensor 172 detects a current IAC flowing through a power line between DFR 260 and neutral point 112 of first MG 110, and outputs the detected value to ECU 170. It is noted that current sensor 172 may be provided in a power line between DFR 260 and neutral point 122 of second MG 120.

ECU 170 determines whether or not connector 310 is inserted into charging port 270, based on aforementioned connector signal CNCT. Furthermore, ECU 170 senses voltage VAC of power supply 402 based on the detected value from voltage sensor 171, and in addition, senses a frequency of power supply 402 by detecting a zero cross point of voltage VAC. Moreover, ECU 170 senses the rated current that can be supplied from power supply 402 through charging cable 300 to the vehicle, based on pilot signal CPLT from EVSE controller 334.

ECU 170 determines the stability and the validity of a standard of the electric power supplied from power supply 402 by using a method that will be described hereinafter, based on sensed voltage VAC, rated current and frequency, and determines whether or not charging of power storage device 150 from power supply 402 can be executed, based on the result of the determination.

Here, if the electric power supplied from power supply 402 does not belong to a predefined standard, but voltage VAC and the frequency are stable and belong to predefined standards, ECU 170 determines that charging itself is possible and controls charging such that power storage device 150 is charged with a predefined minimal rated current.

In other words, if charging of power storage device 150 from power supply 402 is prohibited without exception when an abnormality is found in any one of the detected values of voltage VAC, the rated current and the frequency, charging is prohibited in all cases including a case where charging should be possible. In the present embodiment, however, if it can be determined that the power supply is normal and charging is possible, charging is executed by using the predefined minimal rated current.

It is noted that charging is executed by using the predefined minimal rated current for safety reasons. In other words, in the present embodiment, as a case in which charging should be possible, it is assumed that an abnormality is found in the detected value of the rated current based on pilot signal CPLT (wide variations or outside the predefined standard), but voltage VAC and the frequency are stable and within the predefined standards. In a case where charging is executed by using the predefined minimal rated current, a current exceeding the rated current never flows through charging cable 300.

Figure 6:
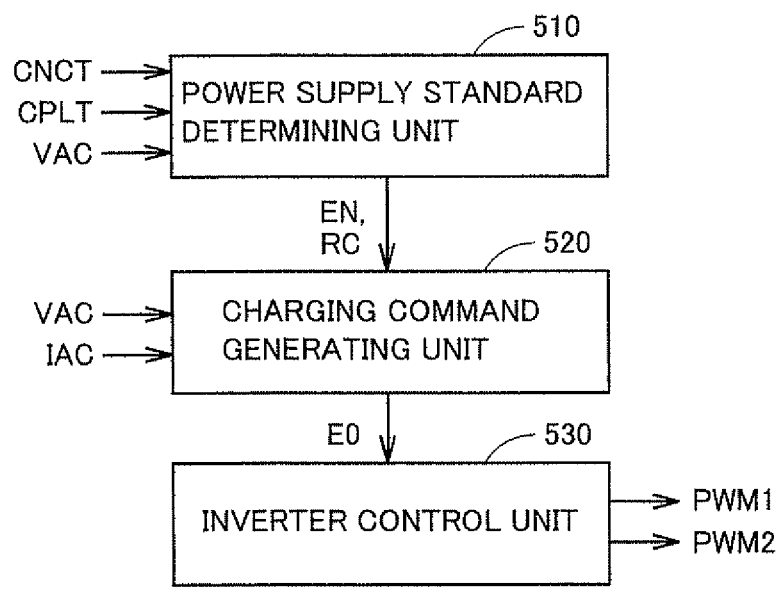
FIG. 6 is a functional block diagram of an ECU regarding charging of a power storage device from a power supply external to the vehicle.

FIG. 6 is a functional block diagram of ECU 170 regarding charging of power storage device 150 from power supply 402 external to the vehicle. Referring to FIG. 6, ECU 170 includes a power supply standard determining unit 510, a charging command generating unit 520 and an inverter control unit 530.

Power supply standard determining unit 510 receives connector signal CNCT, pilot signal CPLT and voltage VAC. Then, power supply standard determining unit 510 determines whether or not connector 310 of charging cable 300 is inserted into charging port 270, based on connector signal CNCT. If power supply standard determining unit 510 determines that connector 310 is inserted into charging port 270, power supply standard determining unit 510 determines the stability of voltage VAC, the rated current and the frequency of power supply 402, based on voltage VAC and pilot signal CPLT. Moreover, power supply standard determining unit 510 determines whether or not each of voltage VAC, the rated current and the frequency belongs to the predefined standard, and in addition, determines whether or not a combination of voltage VAC, the rated current and the frequency matches a predefined combination.

Figure 7:
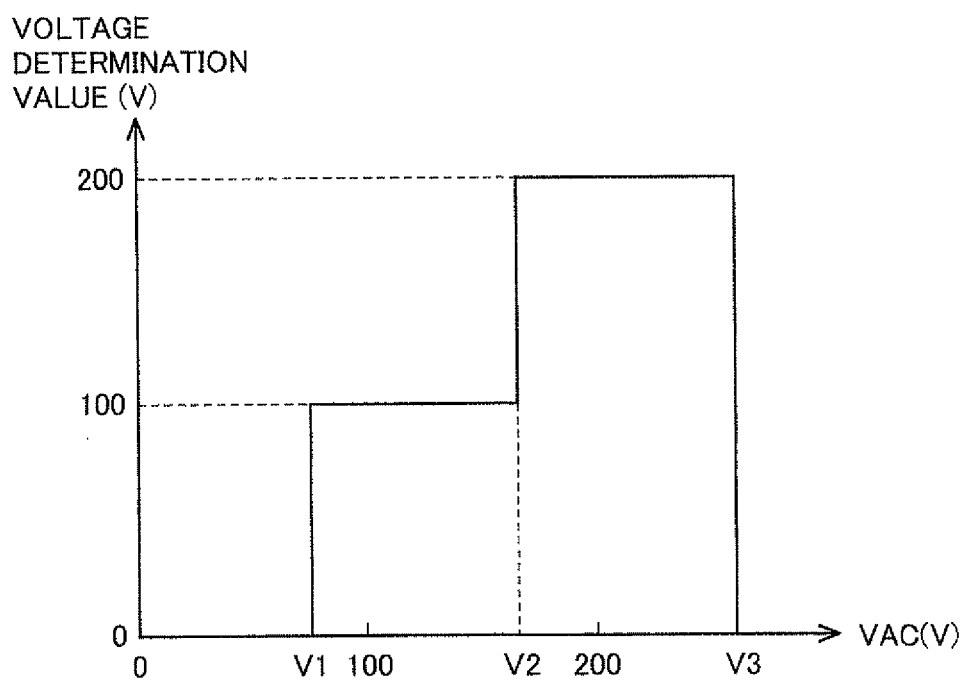
FIG. 7 illustrates one example of determination of the standard of a voltage.

FIG. 7 illustrates one example of determination of the standard of voltage VAC. Referring to FIG. 7, the horizontal axis indicates the detected value (V) of voltage VAC, and the vertical axis indicates the voltage determination value (V). If the detected value is lower than a predefined voltage V1 (for example, 80V), it is determined that voltage VAC is outside the standard. If the detected value is higher than or equal to voltage V1 and lower than a predefined voltage V2 (for example, 160V), it is determined that voltage VAC is within the standard and it is determined that voltage VAC is 100V.

Furthermore, if the detected value is higher than or equal to voltage V2 and lower than a predefined voltage V3 (for example, 260V), it is determined that voltage VAC is within the standard and it is determined that voltage VAC is 200V. If the detected value is higher than or equal to voltage V3, it is determined that voltage VAC is outside the standard. It is noted that, although not shown in the figure, if the detected value is lower than a predefined minute voltage 5V, it is determined that voltage VAC is substantially 0V.

Figure 8:
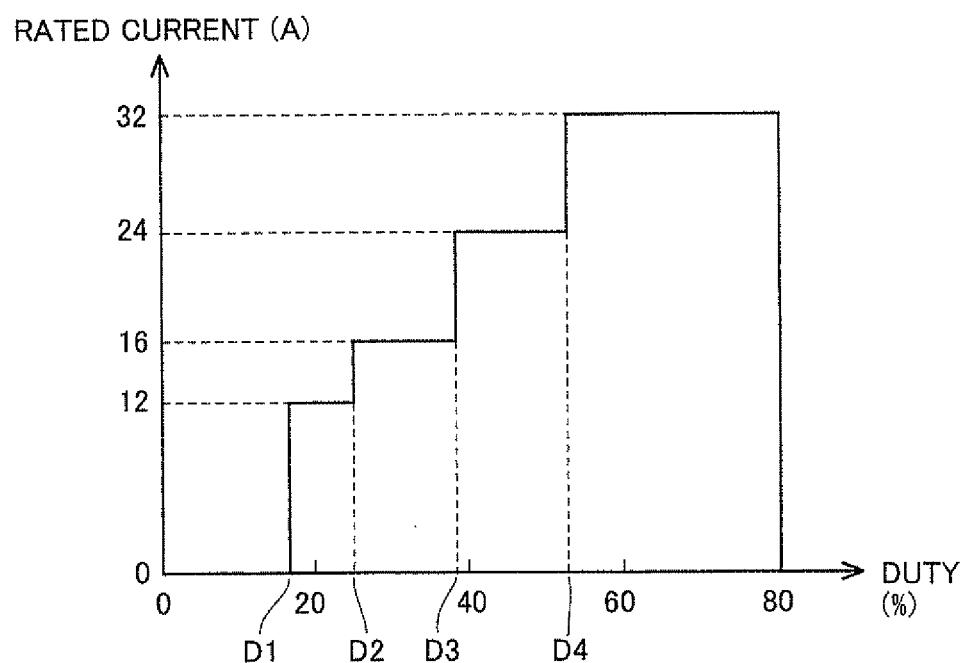
FIG. 8 illustrates one example of determination of the standard of a rated current.

FIG. 8 illustrates one example of determination of the standard of the rated current. Referring to FIG. 8, the horizontal axis indicates the duty (%) of pilot signal CPLT, and the vertical axis indicates the rated current determination value (A). If the duty is smaller than a predefined value D1, it is determined that the rated current is outside the standard. If the duty is greater than or equal to predefined value D1 and smaller than a predefined value D2, it is determined that the rated current is 12 A.

Furthermore, if the duty is greater than or equal to predefined value D2 and smaller than a predefined value D3, it is determined that the rated current is 16 A. If the duty is greater than or equal to predefined value D3 and smaller than a predefined value D4, it is determined that the rated current is 24 A. In addition, if the duty is greater than or equal to predefined value D4 and smaller than 80%, it is determined that the rated current is 32 A. If the duty is greater than or equal to 80%, it is determined that the rated current is outside the standard.

Figure 9:
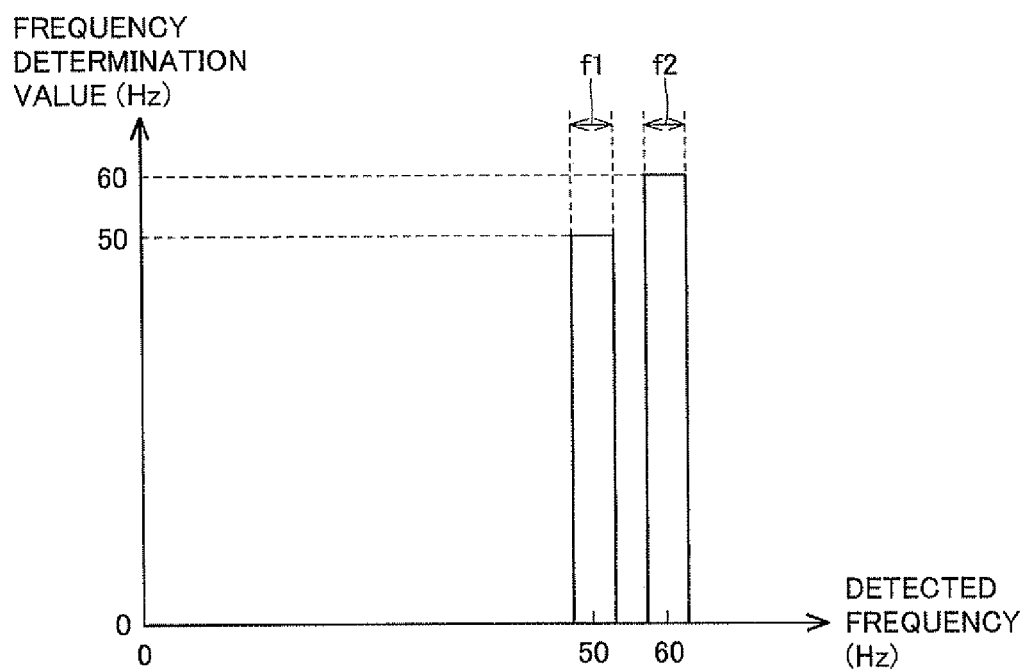
FIG. 9 illustrates one example of determination of the standard of a frequency.

FIG. 9 illustrates one example of determination of the standard of the power supply frequency. Referring to FIG. 9, the horizontal axis indicates the detected value (Hz) of the frequency of power supply 402, and the vertical axis indicates the frequency determination value (Hz). If the detected value is included in a range f1 whose center is set to substantially 50 Hz, it is determined that the frequency is within the standard and it is determined that the frequency is 50 Hz.

Furthermore, if the detected value is included in a range f2 whose center is set to substantially 60 Hz, it is determined that the frequency is within the standard and it is determined that the frequency is 60 Hz. It is noted that, if the detected value is not included in any one of ranges f1 and f2, it is determined that the frequency is outside the standard.

Referring again to FIG. 6, power supply standard determining unit 510 determines whether or not each of voltage VAC, the rated current and the frequency belongs to the predefined standard, by using the above-described method, and determines whether or not the combination of voltage VAC, the rated current and the frequency matches the predefined combination. This predefined combination is set based on a request on the vehicle side, and set, for example, such that the operation of charging control performed on the vehicle side can be ensured. As an example, a combination of voltage VAC of 100V, the rated current of 12 A or 16 A, and the frequency of 50 Hz or 60 Hz, as well as a combination of voltage VAC of 200V, the rated current of 12 A, 16 A, 24 A, or 32 A, and the frequency of 50 Hz or 60 Hz are set as the predefined combination.

Based on the result of the determination, power supply standard determining unit 510 determines whether or not charging of power storage device 150 from power supply 402 is executed, by using a method that will be described hereinafter. If power supply standard determining unit 510 determines that charging is executed, power supply standard determining unit 510 outputs a charging execution command EN for commanding execution of charging control to charging command generating unit 520, and in addition, outputs, to charging command generating unit 520, a charging current command value RC indicating that the rated current indicated by pilot signal CPLT or the minimal rated current described above is set as a target value of the charging current.

While charging command generating unit 520 is receiving charging execution command EN from power supply standard determining unit 510, charging command generating unit 520 generates a zero-phase voltage command E0 for operating each coil of first MG 110 and second MG 120 as well as first inverter 210 and second inverter 220 as a single-phase PWM converter and outputs generated zero-phase voltage command E0 to inverter control unit 530, based on charging current command value RC from power supply standard determining unit 510 as well as voltage VAC from voltage sensor 171 and current IAC from current sensor 172.

Based on zero-phase voltage command E0 from charging command generating unit 520, inverter control unit 530 generates PWM (Pulse Width Modulation) signals for controlling first inverter 210 and second inverter 220 to convert the AC electric power provided from power supply 402 to neutral point 112 of first MG 110 and neutral point 122 of second MG 120 to DC electric power. Then, inverter control unit 530 outputs the generated PWM signals to first inverter 210 and second inverter 220 as signals PWM1 and PWM2, respectively.

Figure 10:
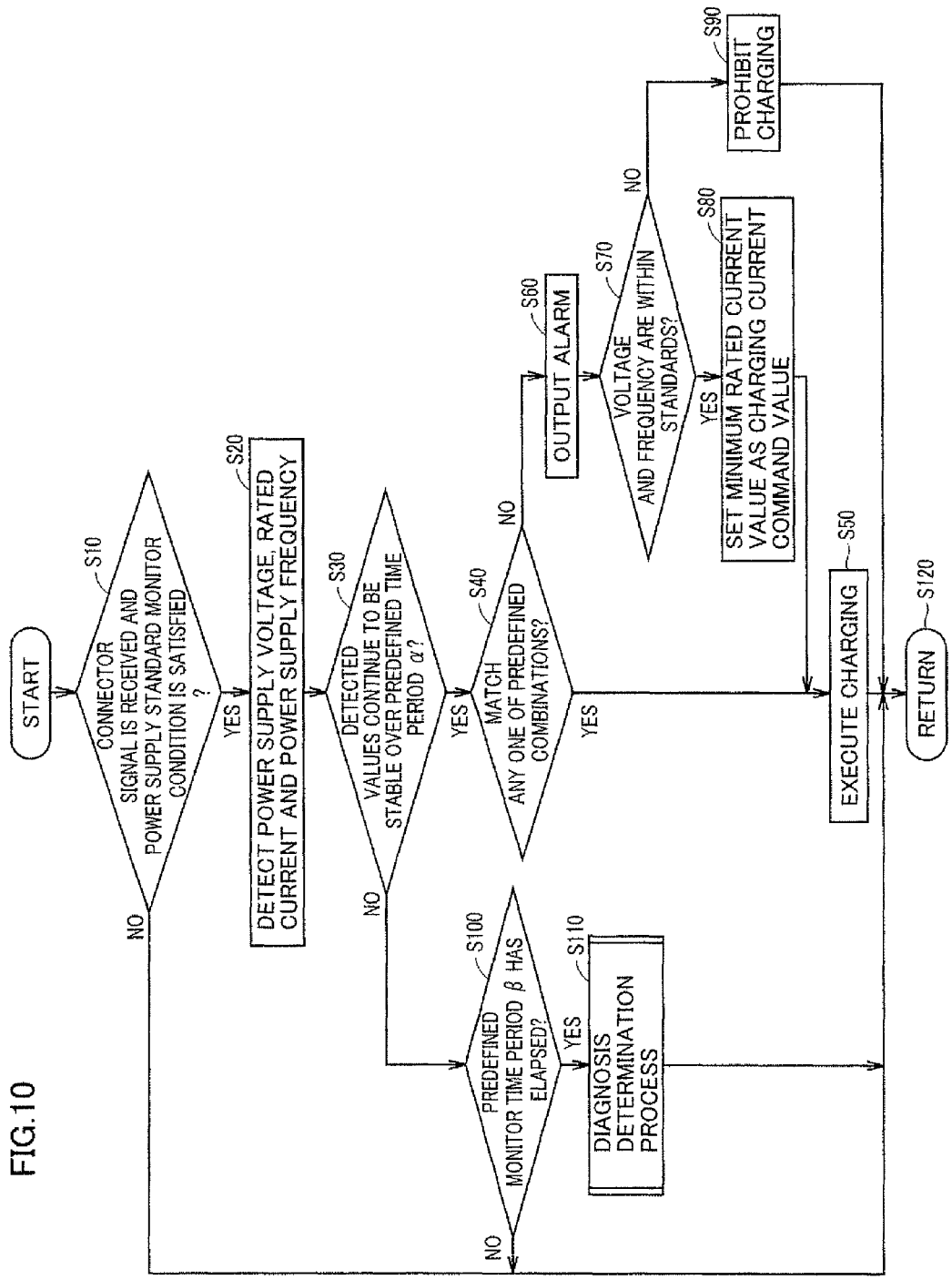
FIG. 10 is a flowchart for illustrating a control structure of a power supply standard determining unit shown in FIG. 6.

FIG. 10 is a flowchart for illustrating a control structure of power supply standard determining unit 510 shown in FIG. 6. It is noted that the process in this flowchart is called for execution from a main routine at regular time intervals or whenever a prescribed condition is satisfied.

Referring to FIG. 10, power supply standard determining unit 510 determines whether or not connector signal CNCT is received and whether or not a power supply standard monitor condition is satisfied (step S10). Specifically, if power supply standard determining unit 510 determines that connector 310 is inserted into charging port 270 based on connector signal CNCT, and in addition, determines that pilot signal CPLT oscillates and an ON command is output to relay 332 in COD 330, power supply standard determining unit 510 determines that the power supply standard monitor condition is satisfied.

Then, power supply standard determining unit 510 receives the detected value of voltage VAC from voltage sensor 171, and in addition, detects the frequency of power supply 402 by detecting the zero cross point of voltage VAC. Furthermore, power supply standard determining unit 510 senses the rated current that can be supplied from power supply 402 through charging cable 300 to the vehicle, by sensing the duty of pilot signal CPLT (step S20).

Then, power supply standard determining unit 510 determines whether or not the detected values of voltage VAC, the rated current and the power supply frequency continue to be stable over a predefined time period α (step S30). Specifically, a permissible range of variations is set for each detected value, and if the detected value continues to be within the permissible range over predefined time period α, it is determined that the detected value is stable.

If it is determined that the detected values are stable (YES in step S30), power supply standard determining unit 510 determines the standards of voltage VAC, the rated current and the frequency by using the maps and the like shown in FIGS. 7 to 9. In addition, power supply standard determining unit 510 determines whether or not a combination of voltage VAC, the rated current and the frequency matches any one of predefined combinations (step S40). It is noted that a plurality of patterns of these predefined combinations are set based on a request on the vehicle side as described above.

If it is determined in step S40 that the combination of voltage VAC, the rated current and the frequency matches any one of the predefined combinations (YES in step S40), power supply standard determining unit 510 turns on DFR 260, and controls first inverter 210, second inverter 220 and converter 200 to execute charging of power storage device 150 from power supply 402 with a voltage, a current and a frequency in accordance with the combination (step S50).

On the other hand, if it is determined in step S40 that the combination of voltage VAC, the rated current and the frequency does not match any one of the predefined combinations (NO in step S40), power supply standard determining unit 510 outputs an alarm (step S60). Then, power supply standard determining unit 510 determines whether or not voltage VAC and the frequency are within the standards (step S70). It is noted that this step S70 is a process for determining whether or not power supply 402 itself is normal.

If it is determined in step S70 that voltage VAC and the frequency are within the standards (YES in step S70), it is determined that power supply 402 itself is normal, and power supply standard determining unit 510 sets a predefined minimum rated current value (12A in the above-described specific example) as charging current command value RC (step S80). Thereafter, power supply standard determining unit 510 causes the process to proceed to step S50, and power supply standard determining unit 510 controls first inverter 210, second inverter 220 and converter 200 to execute charging of power storage device 150 from power supply 402 in accordance with the minimum rated current value, after turning on DFR 260.

On the other hand, if it is determined in step S70 that any one of voltage VAC and the frequency is outside the standards (NO in step S70), it is determined that execution of charging of power storage device 150 from power supply 402 is not preferable, and power supply standard determining unit 510 prohibits charging of power storage device 150 from power supply 402 (step S90). It is noted that, in a case where power storage device 150 is being charged from power supply 402, power supply standard determining unit 510 stops the charging and turns off DFR 260.

If it is determined in step S30 that the detected values are not stable (NO in step S30), power supply standard determining unit 510 determines whether or not a predefined monitor time period β (>α) has elapsed (step S100). If it is determined that monitor time period β has not elapsed (NO in step S100), the process proceeds to step S120. Therefore, until monitor time period β has elapsed, the stability determination in step S30 is repeated.

If it is determined in step S100 that monitor time period β (>α) has elapsed (YES in step S100), power supply standard determining unit 510 performs a diagnosis determination process that will be described hereinafter (step S110).

Figure 11:
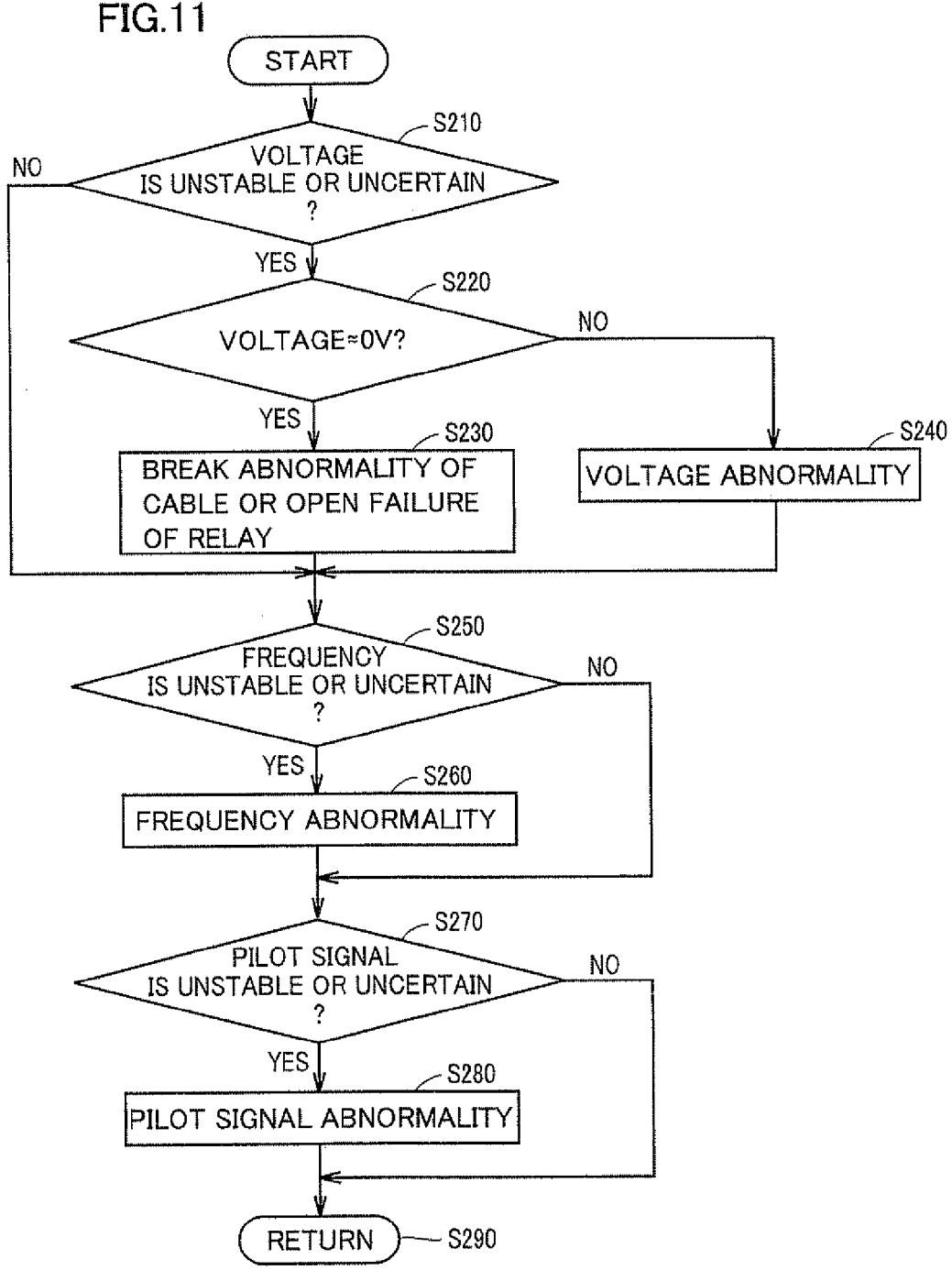
FIG. 11 is a flowchart of a diagnosis determination process shown in FIG. 10.

FIG. 11 is a flowchart of the diagnosis determination process shown in FIG. 10. It is noted that the process in this flowchart is also called for execution from a main routine at regular time intervals or whenever a prescribed condition is satisfied.

Referring to FIG. 11, power supply standard determining unit 510 determines whether or not voltage VAC is unstable or uncertain (step. S210). It is noted that unstable voltage VAC means that voltage VAC is not stable, and uncertain voltage VAC means that voltage VAC is outside the standard (for example, other than 100V and 200V in FIG. 7).

If it is determined in step S210 that voltage VAC is unstable or uncertain (YES in step S210), power supply standard determining unit 510 determines whether or not voltage VAC is substantially 0V (step S220). If it is determined that voltage VAC is substantially 0V (YES in step S220), power supply standard determining unit 510 determines that a break abnormality of charging cable 300 or an open failure of relay 332 in CCID 330 occurs, and diagnosis thereof is stored (step S230). In other words, when this diagnosis determination process is performed, the power supply standard monitor condition is satisfied as shown in FIG. 10, and therefore, connector 310 is inserted into charging port 270, pilot signal CPLT oscillates and the ON command is output to relay 332 in COD 330. Therefore, when voltage VAC is substantially 0V in this situation, it can be determined that charging cable 300 is broken or the open failure occurs at relay 332 in CCID 330.

On the other hand, if it is determined in step S220 that voltage VAC is not substantially 0V (NO in step S220), power supply standard determining unit 510 determines that an abnormality occurs at the voltage, and diagnosis thereof is stored (step S240). It is noted that, if it is determined in step S210 that voltage VAC is not unstable or uncertain (NO in step S210), power supply standard determining unit 510 causes the process to proceed to step S250.

Next, power supply standard determining unit 510 determines whether or not the frequency of power supply 402 is unstable or uncertain (step S250). It is noted that unstable frequency means that the detected frequency has wide variations, and uncertain frequency means that the frequency is outside the standard (for example, the frequency is outside ranges f1 and f2 in FIG. 9).

If it is determined in step S250 that the frequency is unstable or uncertain (YES in step S250), power supply standard determining unit 510 determines that an abnormality occurs at the frequency, and diagnosis thereof is stored (step S260). It is noted that, if it is determined in step S250 that the frequency is not unstable or uncertain (NO in step S250), power supply standard determining unit 510 causes the process to proceed to step S270.

Next, power supply standard determining unit 510 determines whether or not pilot signal CPLT is unstable or uncertain (step S270). It is noted that unstable pilot signal CPLT means that pilot signal CPLT has wide variations of the duty, and uncertain pilot signal CPLT means that the rated current cannot be determined based on the duty of pilot signal CPLT (for example, in a case where the duty is smaller than D1 or greater than 80% in FIG. 8).

If it is determined in step S270 that pilot signal CPLT is unstable or uncertain (YES in step S270), power supply standard determining unit 510 determines that an abnormality occurs at pilot signal CPLT, and diagnosis thereof is stored (step S280). It is noted that, if it is determined in step S270 that pilot signal CPLT is not unstable or uncertain (NO in step S270), power supply standard determining unit 510 causes the process to proceed to step S290.

Next, the process of executing charging based on charging current command value RC generated by power supply standard determining unit 510 will be described.

Figure 12:
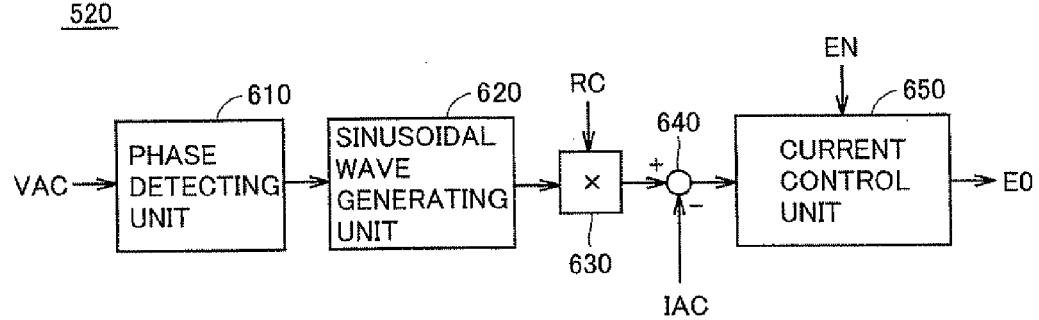
FIG. 12 is a functional block diagram of a charging command generating unit shown in FIG. 6.

FIG. 12 is a functional block diagram of charging command generating unit 520 shown in FIG. 6. Referring to FIG. 12, charging command generating unit 520 includes a phase detecting unit 610, a sinusoidal wave generating unit 620, a multiplying unit 630, a subtracting unit 640, and a current control unit 650.

Phase detecting unit 610 detects the zero cross point of voltage VAC, and detects a phase of voltage VAC based on the detected zero cross point. Sinusoidal wave generating unit 620 generates a sinusoidal wave of the same phase as that of voltage VAC, based on the phase of voltage VAC detected by phase detecting unit 610. For example, sinusoidal wave generating unit 620 can generate the sinusoidal wave of the same phase as that of voltage VAC, based on the phase information from phase detecting unit 610, by using a table of a sinusoidal function.

Multiplying unit 630 multiplies charging current command value RC from power supply standard determining unit 510 (FIG. 6) by the sinusoidal wave from sinusoidal wave generating unit 620, and outputs the result of the operation as a current command value. Subtracting unit 640 subtracts current IAC from the current command output from multiplying unit 630, and outputs the result of the operation to current control unit 650.

While receiving charging execution command EN from power supply standard determining unit 510, current control unit 650 generates a zero-phase voltage command E0 for causing current IAC to follow the current command, based on a deviation between the current command and current IAC. This zero-phase voltage command E0 is a voltage that is uniformly added to a voltage command for each phase of at least one of first inverter 210 and second inverter 220. This zero-phase voltage command E0 itself does not contribute to the rotation torque of first MG 110 and second MG 120.

Figure 13:
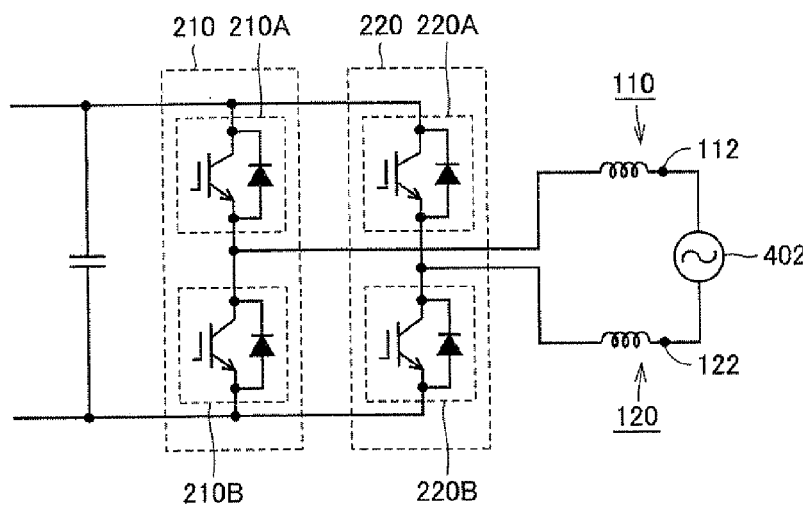
FIG. 13 illustrates a zero-phase equivalent circuit of first and second inverters as well as first and second MGs shown in FIG. 3.

FIG. 13 illustrates a zero-phase equivalent circuit of first and second inverters 210 and 220 as well as first and second MGs 110 and 120 shown in FIG. 3. Each of first and second inverters 210 and 220 is formed of a three-phase bridge circuit as shown in FIG. 3, and there are eight patterns of on/off combinations of six switching elements in each inverter. In the two of the eight switching patterns, an interphase voltage becomes zero, and such a voltage state is referred to as a zero voltage vector. The zero voltage vector can be understood that the three switching elements of the upper arm are in the same switching state (all on or off), and similarly, the three switching elements of the lower arm are in the same switching state.

During charging of power storage device 150 from power supply 402 external to the vehicle, the zero voltage vector is controlled in at least one of first and second inverters 210 and 220, based on zero-phase voltage command E0 generated by charging command generating unit 520 (FIG. 12). Therefore, in this FIG. 13, the three switching elements of the upper arm of first inverter 210 are collectively shown as an upper arm 210A, and the three switching elements of the lower arm of first inverter 210 are collectively shown as a lower arm 210B. Similarly, the three switching elements of the upper arm of second inverter 220 are collectively shown as an upper arm 220A, and the three switching elements of the lower arm of second inverter 220 are collectively shown as lower arm 220B.

As shown in FIG. 13, this zero-phase equivalent circuit can be regarded as a single-phase PWM converter that accepts an input of the single-phase AC electric power provided from power supply 402 to neutral point 112 of first MG 110 and neutral point 122 of second MG 120. Accordingly, by changing the zero voltage vector in at least one of first and second inverters 210 and 220 based on zero-phase voltage command E0 and controlling switching of first and second inverters 210 and 220 so that first and second inverters 210 and 220 operate as the arms of the single-phase PWM converter, the AC electric power supplied from power supply 402 can be converted to DC electric power and power storage device 150 can be charged.

As described above, in the present embodiment, the electric power that can be supplied from power supply 402 to the plug-in hybrid vehicle, that is, voltage VAC, the rated current and the power supply frequency, are detected. If it is determined that the combination of these detected values matches the predefined combination, charging of power storage device 150 from power supply 402 is executed with the voltage, the current and the frequency in accordance with the combination. On the other hand, if it is determined that the combination of voltage VAC, the rated current and the frequency does not match any one of the predefined combinations and if it is determined that power supply 402 itself is normal, charging is executed by limiting the charging current to the predefined minimum rated current value. If it is determined that the combination of voltage VAC, the rated current and the frequency does not match any one of the predefined combinations and if it is determined that power supply 402 is abnormal, charging is prohibited. In other words, if it is determined that the combination of voltage VAC, the rated current and the frequency does not match the predefined combination, charging is not prohibited without exception, but executed by limiting the charging current to the predefined minimum rated current value if it is determined that power supply 402 is normal. Therefore, according to the present embodiment, loss of an opportunity for charging of power storage device 150 from power supply 402 external to the vehicle can be suppressed as much as possible, and power storage device 150 can be safely charged from power supply 402.

Furthermore, according to the present embodiment, the power supply standard is determined, provided that connector signal CNCT is generated. Therefore, unnecessary determination of the power supply standard in a case where connector 310 is not connected to charging port 270 can be prevented.

In addition, according to the present embodiment, it is determined whether or not voltage VAC is substantially 0V when the power supply standard monitor condition including oscillation of pilot signal CPLT as a condition is satisfied. Therefore, the break abnormality of charging cable 300 can be detected.

It is noted that, in the above embodiment, if it is determined that the combination of voltage VAC, the rated current and the frequency does not match the predefined combination and if it is determined that power supply 402 is normal, charging is executed by limiting the charging current to the minimum rated current value. The charging current here may be smaller than the minimum rated current. The predefined minimum rated current, however, is a maximum charging current with which the power storage device can be safely charged, and is suitable as a charging current that can be selected.

Furthermore, in the above embodiment, the standard of the frequency of power supply 402 is also determined. In a case where it is considered unlikely that the frequency is outside the standard when voltage VAC is within the standard, however, it is also possible that the stability and the standard of the frequency are not determined.

In the above embodiment, power storage device 150 is charged by providing neutral point 112 of first MG 110 and neutral point 122 of second MG 120 with the charging electric power supplied from power supply 402 and operating first and second inverters 210 and 220 as the single-phase PWM converter. A charger specifically designed for charging of power storage device 150 from power supply 402 may, however, be provided separately.

Figure 14:
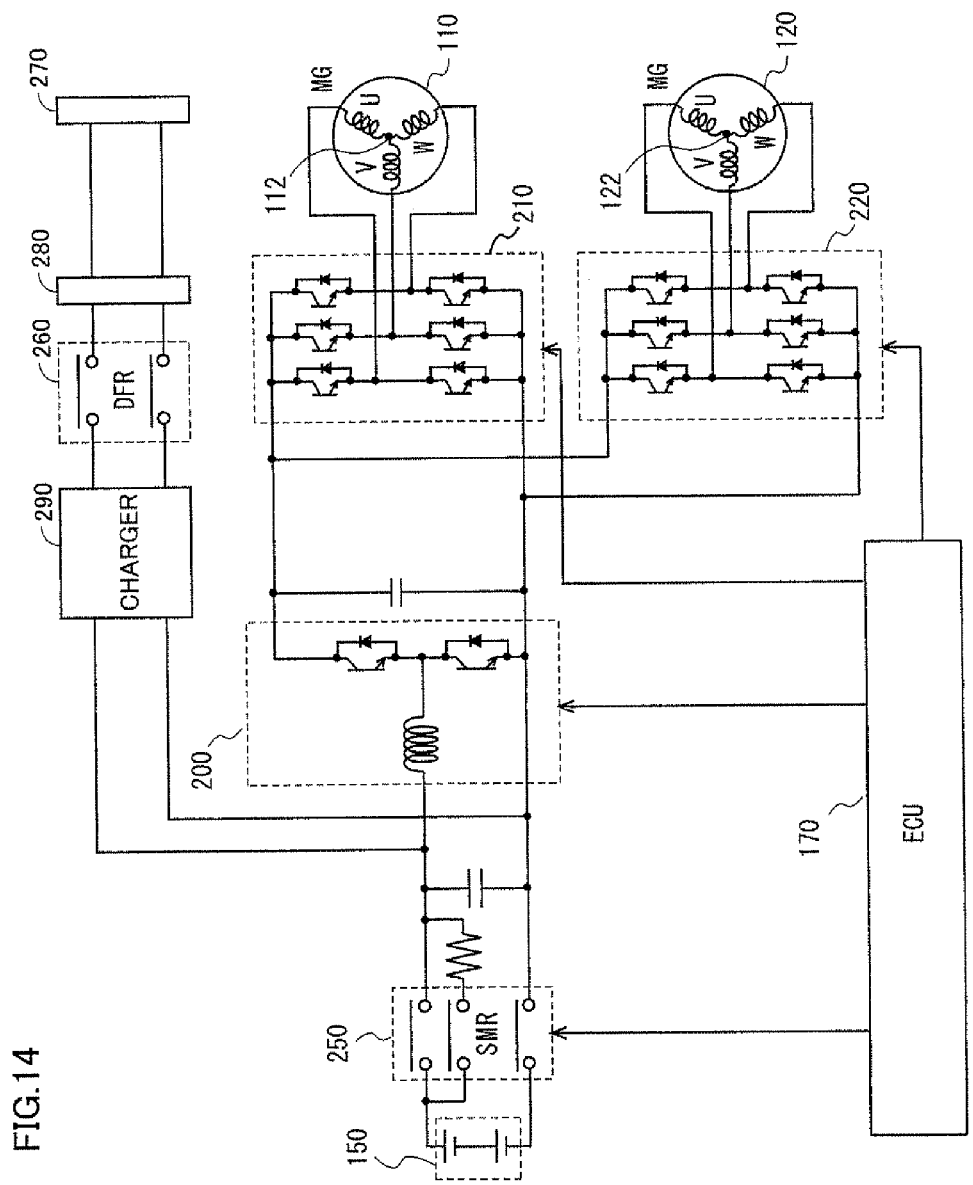
FIG. 14 is an overall configuration diagram of an electrical system in a plug-in hybrid vehicle on which a charger dedicated to charging a power storage device from a power supply is mounted.

FIG. 14 is an overall configuration diagram of an electrical system in the plug-in hybrid vehicle on which the charger specifically designed for charging of power storage device 150 from power supply 402 is mounted. Referring to FIG. 14, this electrical system further includes a charger 290, as compared with the electrical system shown in FIG. 3. Charger 290 is connected to a power line between SMR 250 and converter 200, and charging port 270 is connected on the input side of charger 290 with DFR 260 and LC filter 280 interposed therebetween. During charging of power storage device 150 from power supply 402, charger 290 converts charging electric power supplied from power supply 402 to a voltage level of power storage device 150 and outputs the charging electric power to power storage device 150, based on a control signal from ECU 170, to charge power storage device 150.

Figure 15:
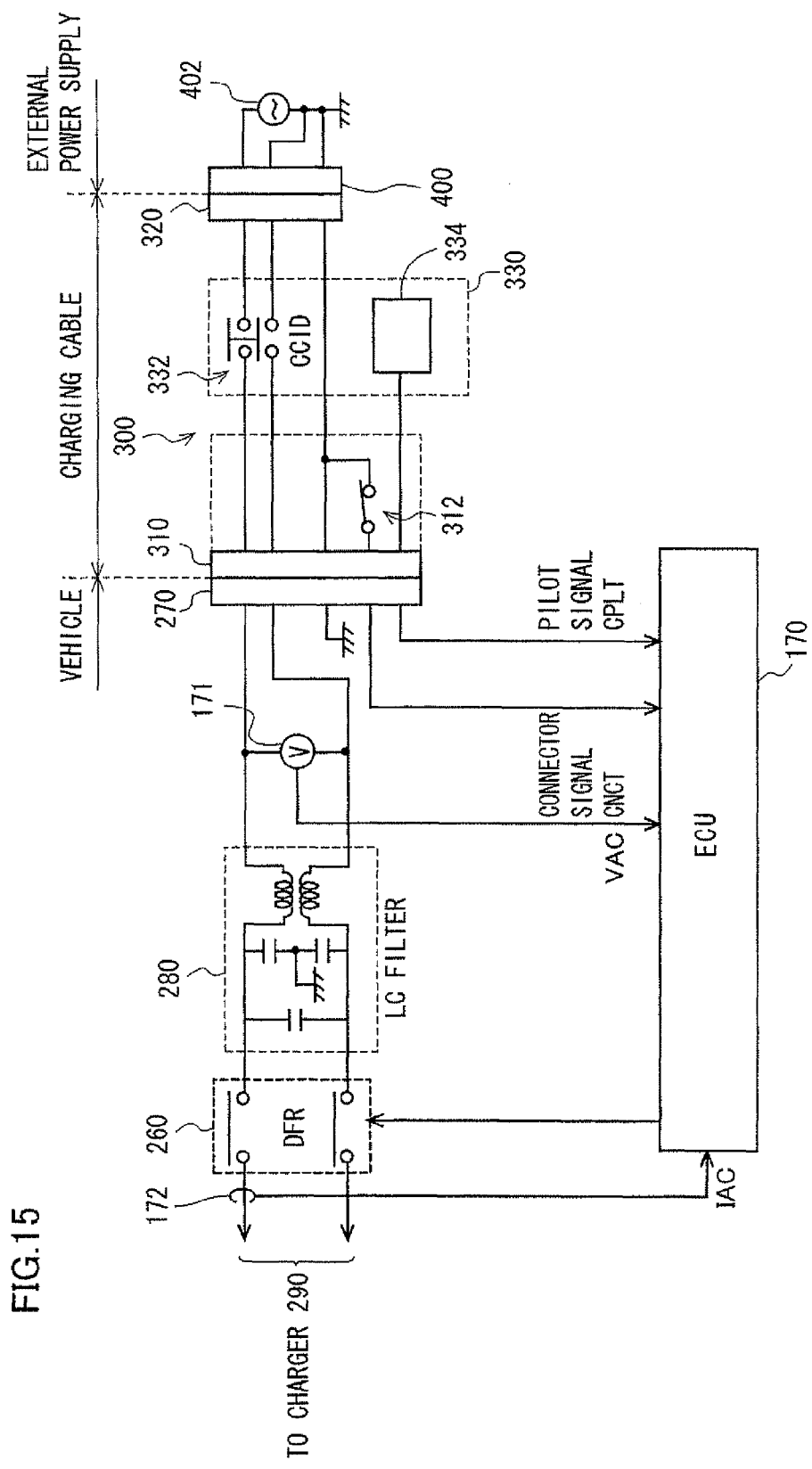
FIG. 15 is a schematic configuration diagram of a portion related to a charging mechanism of the electrical system shown in FIG. 14.

It is noted that, as shown in FIG. 15, a portion related to a charging mechanism of the electrical system shown in FIG. 14 has the same configuration as that of the charging mechanism in the above embodiment shown in FIG. 4.

In the above embodiment, a series/parallel-type hybrid vehicle has been described, in which motive power of engine 100 is distributed into drive wheel 160 and first MG 110 by employing power split device 130. The present invention, however, is also applicable to other types of hybrid vehicles. In other words, the present invention is also applicable to, for example, a so-called series-type hybrid vehicle using engine 100 only for driving first MG 110 and generating the driving force of the vehicle by employing only second MG 120, a hybrid vehicle in which only regenerative energy among kinetic energy generated by engine 100 is recovered as electric energy, a motor-assisted-type hybrid vehicle in which an engine is used as a main power source and a motor assists the engine as required, and the like.

Furthermore, the present invention is also applicable to a hybrid vehicle that does not include converter 200.

In addition, the present invention is also applicable to an electric vehicle that does not include engine 100 and travels by using only electric power, and a fuel cell vehicle that further includes a fuel cell as a power supply in addition to the power storage device.

It is noted that, in the above, charging port 270 corresponds to an embodiment of "vehicle inlet" in the present invention, and voltage sensor 171 corresponds to an embodiment of "voltage detecting unit" in the present invention. Furthermore, power supply standard determining unit 510 in ECU 170 corresponds to an embodiment of "signal detecting unit" in the present invention. EVSE controller 334, the control pilot line and power supply standard determining unit 510 form an embodiment of "rated current detecting unit" in the present invention, and voltage sensor 171, EVSE controller 334, the control pilot line and power supply standard determining unit 510 form an embodiment of "detecting unit" in the present invention.

In addition, first and second MGs 110 and 120 as well as first and second inverters 210 and 220 form an embodiment of "charging execution unit" in the present invention, and ECU 170 corresponds to an embodiment of "control unit" in the present invention. Moreover, first and second MGs 110 and 120 correspond to an embodiment of "first AC rotating electric machine" and "second AC rotating electric machine" in the present invention, respectively, and first and second inverters 210 and 220 correspond to an embodiment of "first inverter" and "second inverter" in the present invention, respectively. Furthermore, charging command generating unit 520 and inverter control unit 530 in ECU 170 form an embodiment of "charging control unit" in the present invention.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims,

The invention claimed is:

1. A charging apparatus for a vehicle by which a vehicle-mounted power storage device for driving the vehicle is charged from a power supply external to the vehicle, comprising:
   a detecting unit for detecting electric power that can be supplied from said power supply to said vehicle, said detecting unit includes
      a voltage detecting unit for detecting the voltage of said power supply, and
      a rated current detecting unit for detecting a rated value of a current that can be received from said power supply;

a charging execution unit for receiving the electric power supplied from said power supply and executing charging of said power storage device, in accordance with a provided command; and a control unit for determining whether or not a suppliable electric power detected by said detecting unit is included in a predefined standard, and controlling said charging execution unit based on a result of determination, said control unit controlling said charging execution unit to execute charging in accordance with the suppliable electric power, when said control unit determines that said suppliable electric power is included in said predefined standard, controlling said charging execution unit to execute charging by limiting a charging current to a predefined value, when said control unit determines that said suppliable electric power is not included in said predefined standard and when said control unit determines that said power supply is normal based on a voltage of said power supply detected by said detecting unit, said predefined value being a minimal rated current value included in said predefined standard, and prohibiting charging, when said control unit determines that said suppliable electric power is not included in said predefined standard and when said control unit determines that said power supply is abnormal, wherein said control unit determines whether or not said suppliable electric power is included in said predefined standard, based on whether or not a combination of the voltage detected by said voltage detecting unit and a rated current detected by said rated current detecting unit matches at least one predefined combination.

2. The charging apparatus for a vehicle according to claim 1, wherein said vehicle includes a vehicle inlet configured to be capable of connecting a charging cable through which the electric power is supplied from said power supply to the vehicle, and said control unit performs a process of determining whether or not said suppliable electric power is included in said predefined standard, when said control unit determines that said charging cable is connected to said vehicle inlet, based on a connection signal indicating that said charging cable is connected to said vehicle inlet.

3. The charging apparatus for a vehicle according to claim 1, wherein said control unit further detects a frequency of said power supply based on the detected voltage, and determines whether or not said suppliable electric power is included in said predefined standard, based on whether or not a combination of said detected voltage, said rated current and said frequency matches said at least one predefined combination.

4. The charging apparatus for a vehicle according to claim 1, wherein said rated current detecting unit includes an EVSE (Electric Vehicle Supply Equipment) controller provided outside said vehicle for generating a pilot signal having a duty set in accordance with a magnitude of said rated current, a control pilot line through which said pilot signal can be transmitted to said vehicle, and a signal detecting unit mounted on said vehicle for detecting said rated current based on said pilot signal received from said control pilot line, and said control unit determines that at least one of said EVSE controller and said control pilot line is abnormal when said control unit determines that said suppliable electric power is not included in said predefined standard and when said control unit determines that said power supply is normal based on the voltage of said power supply, and controls said charging execution unit to execute charging by limiting the charging current to said predefined value.

5. The charging apparatus for a vehicle according to claim 1, wherein said rated current detecting unit includes an EVSE controller provided outside said vehicle for generating a pilot signal having a duty set in accordance with a magnitude of said rated current, a control pilot line through which said pilot signal can be transmitted to said vehicle, and a signal detecting unit mounted on said vehicle for detecting said rated current based on said pilot signal received from said control pilot line, said EVSE controller can be operated by receiving the electric power from said power supply, and said control unit determines that a conducting path is disconnected in a power line through which the electric power received from said power supply is supplied to said vehicle, when said pilot signal is sensed by said signal detecting unit and when the voltage detected by said voltage detecting unit is substantially zero.

6. The charging apparatus for a vehicle according to claim 1, wherein said charging execution unit is mounted on said vehicle, said charging execution unit includes a first AC rotating electric machine including, as a stator winding, a first multiphase winding connected in a form of a star, a second AC rotating electric machine including, as a stator winding, a second multiphase winding connected in a form of a star, a first inverter connected to said first multiphase winding for performing electric power conversion between said first AC rotating electric machine and said power storage device, a second inverter connected to said second multiphase winding for performing electric power conversion between said second AC rotating electric machine and said power storage device, a pair of power lines connected to a first neutral point of said first multiphase winding and a second neutral point of said second multiphase winding for providing said first and second neutral points with the electric power supplied from said power supply, and a charging control unit for controlling said first and second inverters to convert a voltage of the electric power provided from said pair of power lines to said first and second neutral points and charge said power storage device.

7. The charging apparatus for a vehicle according to claim 1, wherein said charging execution unit is mounted on said vehicle, and said charging execution unit includes a charger for converting the electric power supplied from said power supply to a voltage level of said power storage device and charging said power storage device.

8. A method for charging a vehicle configured such that a vehicle-mounted power storage device for driving the vehicle can be charged from a power supply external to the vehicle, comprising:
- a first step of detecting electric power that can be supplied from said power supply to said vehicle, including detecting the voltage of said power supply and a rated value of a current that can be received from said power supply;
- a second step of determining whether or not a suppliable electric power detected in said first step is included in a predefined standard based on whether or not a combination of said voltage of said power supply that has been detected and the rated current that has been detected matches at least one predefined combination;
- a third step of executing charging in accordance with the suppliable electric power when it is determined that said suppliable electric power is included in said predefined standard;
- a fourth step of determining whether or not said power supply is normal based on a voltage of said power supply detected in said first step, when it is determined that said suppliable electric power is not included in said predefined standard;
- a fifth step of executing charging by limiting a charging current to a predefined value when it is determined that said power supply is normal, said predefined value being a minimal rated current value included in said predefined standard; and
- a sixth step of prohibiting charging when it is determined that said power supply is abnormal.

9. The method for charging a vehicle according to claim 8, wherein
- said vehicle includes a vehicle inlet configured to be capable of connecting a charging cable through which the electric power is supplied from said power supply to the vehicle,
- said method for charging a vehicle further comprises a seventh step of determining whether or not said charging cable is connected to said vehicle inlet, based on a connection signal indicating that said charging cable is connected to said vehicle inlet, and
- when it is determined in said seventh step that said charging cable is connected to said vehicle inlet, a process of determining whether or not said suppliable electric power is included in said predefined standard is performed in said second step.

10. The method for charging a vehicle according to claim 8, wherein
- in said first step, a frequency of said power supply is further detected based on said voltage that has been detected, and
- in said second step, it is determined whether or not said suppliable electric power is included in said predefined standard, based on whether or not a combination of the detected voltage, said rated current and said frequency matches said at least one predefined combination.

11. The method for charging a vehicle according to claim 8, wherein
- a pilot signal having a duty set in accordance with a magnitude of said rated current is generated outside said vehicle,
- said pilot signal is sent through a control pilot line to said vehicle,
- in said first step, said rated value of the current is detected based on said pilot signal received from said control pilot line,
- said method for charging a vehicle further comprises an eighth step of determining that an abnormality is found in said pilot signal when it is determined in said second step that said suppliable electric power is not included in said predefined standard and when it is determined in said fourth step that said power supply is normal, and
- when it is determined in said eighth step that said abnormality is found, charging is executed by limiting the charging current to said predefined value in said fifth step.

12. The method for charging a vehicle according to claim 8, wherein
- a pilot signal having a duty set in accordance with a magnitude of said rated current is generated outside said vehicle by using the electric power from said power supply,
- said pilot signal is sent through a control pilot line to said vehicle,
- in said first step, said rated value of the current is detected based on said pilot signal received from said control pilot line, and
- said method for charging a vehicle further comprises a ninth step of determining that a conducting path is disconnected in a power line through which the electric power received from said power supply is supplied to said vehicle, when said pilot signal is sensed in said first step and when said voltage that has been detected is substantially zero.

* * * * *